United States Patent [19]
Weir

[11] Patent Number: 6,025,313
[45] Date of Patent: Feb. 15, 2000

[54] METHOD FOR PROTECTING STEEL ALLOYS FROM EMBRITTLING EFFECTS OF BENZYL ALCOHOL PAINT STRIPPERS, AND COMPOSITIONS

[75] Inventor: John Douglas Weir, Huntington, N.Y.

[73] Assignee: Northrop Grumman Corporation, Los Angeles, Calif.

[21] Appl. No.: 09/025,901

[22] Filed: Feb. 19, 1998

[51] Int. Cl.⁷ ............................. C09D 9/00; C23G 1/00; C23G 5/02; B08B 3/04
[52] U.S. Cl. .................... 510/201; 510/203; 510/202; 510/255; 510/258; 510/401; 510/466; 134/26; 134/27; 134/28; 134/29; 134/38
[58] Field of Search ................................. 510/202, 203, 510/206, 201, 401, 258, 255, 466, 505; 134/26, 28, 27, 29, 38

[56] References Cited

U.S. PATENT DOCUMENTS

| | | | |
|---|---|---|---|
| 4,628,076 | 12/1986 | Chang et al. .......................... | 525/440 |
| 4,732,695 | 3/1988 | Francisco ............................. | 252/162 |
| 5,431,739 | 7/1995 | Bengston ............................. | 134/2 |
| 5,454,985 | 10/1995 | Harbin ................................ | 252/558 |
| 5,464,888 | 11/1995 | Owen .................................. | 524/104 |
| 5,721,204 | 2/1998 | Maxwell et al. ..................... | 510/206 |
| 5,728,666 | 3/1998 | Vitomir ............................... | 510/203 |

*Primary Examiner*—Yogendra Gupta
*Assistant Examiner*—Dawn L. Garrett
*Attorney, Agent, or Firm*—Terry J. Anderson; Karl J. Hoch, Jr.

[57] ABSTRACT

Method for applying an aqueous benzyl alcohol paint stripping composition to the surface of a high strength steel substrate or of an assembly containing high strength steel components, such as steel fasteners on the surface of aircraft assemblies, while minimizing the effect of hydrogen-induced embrittlement, hydrogen-induced cracking and corrosion normally caused by aqueous benzyl alcohol. The invention comprises applying a liquid silane to the surface of the steel substrate or components immediately before and/or as an ingredient of a novel aqueous benzyl alcohol composition of the present invention which contains from about 1% to 10% by volume of the liquid silane.

11 Claims, No Drawings

METHOD FOR PROTECTING STEEL ALLOYS FROM EMBRITTLING EFFECTS OF BENZYL ALCOHOL PAINT STRIPPERS, AND COMPOSITIONS

BACKGROUND OF THE INVENTION

1. Field of the Invention

The present invention relates to novel benzyl alcohol compositions for stripping coatings such as paint coatings from high strength steel surfaces such as cadmium-plated steel, or from assemblies containing high strength steel components such as aircraft surfaces containing high strength steel fasteners, while minimizing the effects of corrosion or hydrogen-induced embrittlement normally caused by the action of benzyl alcohol formulations on such steel surfaces.

2. State of the Art

Water-based benzyl alcohol paint stripping compositions have been developed as substitutes for methylene chloride-based paint strippers which were highly effective for their intended purpose but have been found to be hazardous air pollutants and potential human carcinogens due to the presence of methylene chloride. Reference is made to U.S. Pat. Nos. 4,732,695 and 5,454,985 for their disclosure of non-hazardous, low cost, effective aqueous paint stripping compositions based upon benzyl alcohol, and the advantages of such compositions over prior-known organic solvent compositions.

While such aqueous benzyl alcohol stripping compositions are very effective for their intended purposes, it has been found that they can cause hydrogen embrittlement and hydrogen-induced cracking of high strength steel such as but not limited to, AISI 4340 and 300M, and Aer Met® 100 alloy, which can be cadmium plated or ion vapor deposited with aluminum, or otherwise coated. It is well known that structural steel, normally designed to be heat-treated above 180 ksi, can be subject to hydrogen induced embrittlement, hydrogen induced cracking as well as corrosion induced by the environment, particularly after treatment with conventional benzyl alcohol paint stripping compositions.

Aqueous aromatic acid compositions are also known for removing flux/contamination from printed circuit boards, and reference is made to U.S. Pat. No. 5,431,739 which discloses such compositions containing various additives including corrosion inhibitors for the solder and other materials on the printed circuit boards.

SUMMARY OF THE INVENTION

The present invention relates to methods and compositions for stripping coatings such as paints from high strength steel substrates and components. The technique involves applying to the surface of the coating or steel, before and/or as a component of an applied aqueous benzyl alcohol stripping composition, a liquid silane surface treating agent. It has been found that the liquid silane, whether pre-applied or applied as an ingredient of the aqueous benzyl alcohol stripping composition, forms a barrier layer on the surface of the metal substrate or component which protects high strength steel against hydrogen-induced embrittlement, hydrogen-induced cracking and corrosion normally caused by the aqueous benzyl alcohol stripping compositions.

DETAILED DESCRIPTION

The novel method of the present invention involves protecting the surface of high strength metals against hydrogen-induced embrittlement, cracking and/or corrosion while stripping coatings such as paint therefrom by means of an aqueous benzyl alcohol stripping composition, comprising the step of (a) applying a layer of a liquid silane compound over the surface of the coating to be stripped, prior to the application of a layer of a conventional aqueous benzyl alcohol stripping composition or of a layer of a novel aqueous benzyl alcohol composition containing from about 1% to about 10% by volume of the silane compound, or (b) applying a layer of novel aqueous benzyl alcohol stripping composition of the present invention containing from about 1% to about 10% by volume of the silane compound directly to the surface of the coating or paint layer to be removed from the surface of the high strength steel covered thereby.

In either case, the silane compound penetrates or migrates to the interface of the metal and the paint, with the stripping composition, to form a protective silane layer on the metal surface during or after the paint layer is swollen and separated from the metal surface by the benzyl alcohol/water stripping composition.

The novel aqueous benzyl alcohol stripping compositions of the present invention comprise conventional aqueous benzyl alcohol compositions to which is added from about 1% to about 10% by volume, preferably 5–10%, of a liquid, silane compound. Such compositions generally contain between about 30% to about 60% by weight of benzyl alcohol, preferably 35–50%, from 1% up to about 10% by weight, preferably 5–10%, of an alkali such as an alkali metal hydroxide, an alkaline earth metal hydroxide or ammonium hydroxide, from 3% up to about 15% by weight, preferably 5–15%, of one or more wetting or coupling agents which have an affinity for both water and for benzyl alcohol to render mixtures thereof miscible or co-soluble, such as boric acid-diethanolamine reaction products and long chain alkyl-substituted aryl compounds such as phenol, and the balance water, preferably greater than about 45% by weight.

The critical silane additive to the present stripping compositions preferably comprises a hydrophilic hydroxyl- or lower alkoxyl-terminated silane compound, such as 3-glycidoxy-propyltrimethoxy silane, which is commercially-available under the trade designation Dow Corning Z-6040. This is an organofunctional hydrophilic silane which hydrolyzes to form silanol groups capable of bonding with inorganic surfaces such as metal and having an affinity for organic materials. Also suitable is a water-soluble composition available under the trademark Rain-X® which is a 9% solution of a mixture of siloxane silanes in water-miscible alcohols, essentially ethyl alcohol. Hydrophobic silane compounds are also suitable.

The essential novelty of the present methods and the novel stripping compositions of the present invention is that they protect high strength steel substrates or components against hydrogen embrittlement, cracking and corrosion normally induced by aqueous benzyl alcohol paint stripping formulations without significantly reducing the effectiveness of the stripping composition for its intended purpose, namely, the environmentally-compliant, low or non-hazardous, low cost, rapid and thorough stripping of coatings, particularly paint coatings, from such steel substrates or components including structural assemblies containing high strength steel, such as aircraft components and assemblies.

The following comparative testing was conducted on identical unpainted specimens or coupons of cadmium-plated high strength steel designated "Cad Plated IAW QQ-P-416F Type 1, Class 2, baked within 30 minutes of plating at 375° F. for 100 hours, dichromate sealed", as required by military test procedures. The coupon material is AISI 4340 per MIL-S-5000E, configured according to ASTM F519-93 Type 1a. The steel was heat treated and tempered according to MIL-H-6875H to a hardness of HRC 51–54. The purpose of the testing was to evaluate the hydrogen embrittling effect of aqueous benzyl alcohol paint stripping compositions A and B which are identical except that composition B has added thereto 5% by volume of Dow Z-6040 silane.

All testing was conducted in accordance with Grumman Technology Services Procedure Number QSL 26906-95 dated Nov. 21, 1995 titled "Procedure For Embrittlement Testing of Plating Processes and Aircraft Maintenance Chemicals", under a test load of 75% of the original notched tensile strength.

In the initial testing, nine of the control coupons were treated, in the absence of any silane, with the following aqueous benzyl alcohol paint stripping composition A:

| COMPOSITION A | |
|---|---|
| Ingredients | % by weight (approx.) |
| Benzyl alcohol | 40 |
| Ammonium hydroxide | <5 |
| Linear alkyl aryl hydrocarbon | <5 |
| Boric acid-diethanolamine | <5 |
| Water | >45 |

The treated coupons are then subjected to the embrittlement testing under the load of 7071 pounds for a plurality of hours, with the following results:

| Coupon | Test Duration | Results | Static Residual |
|---|---|---|---|
| 1 | 169 hours | failure | none |
| 2 | 169 hours | failure | none |
| 3 | 211.7 hours | no failure | data not determined |
| 4 | 23.9 hours | failure | none |
| 5 | 115 hours | failure | none |
| 6 | 114 hours | failure | none |
| 7 | 214.5 hours | no failure | data not determined |
| 8 | 11.0 hours | failure | none |
| 9 | 30.8 hours | failure | none |

Next, three of the coupons 10–12, were treated with the following silane-containing aqueous benzyl alcohol paint stripping composition B

| Composition B | |
|---|---|
| Ingredients | % by weight (approx.) |
| Benzyl alcohol | 40 |
| Ammonium hydroxide | <5 |
| Linear alkyl aryl hydrocarbon | <5 |
| Boric acid-diethanolamine | <5 |
| Water | >45 |
| Plus 5 vol. % Dow Z-6040 | |

Another three of the coupons 13–15 were first soaked for 15 minutes in a naphtha solution containing 5% by volume of the Dow Z-6040 silane, and then treated with the stripping composition B.

Next, the coupons 10–15 were subjected to the same embrittlement testing as the control coupons 1–9, with the following results:

| Coupon | Test Duration | Results | Static Residual |
|---|---|---|---|
| 10 | 207.8 hours | no failure | 7800 pounds |
| 11 | 207.8 hours | no failure | 6640 pounds |
| 12 | 207.8 hours | failure-(pass 200 hrs.) | None |
| 13 | 213.2 hours | no failure | 8820 pounds |
| 14 | 213.2 hours | no failure | 8830 pounds |
| 15 | 213.2 hours | no failure | 8810 pounds |

As is clear from a comparison of the test results, the coupons 10–15 treated with the novel aqueous benzyl alcohol stripping compositions of the present invention have substantially greater strength, as evaluated by sustained load (creep) testing, compared to the control coupons 1–9.

In subsequent testing, three of the control coupons 16–18 were treated with the following commercially-available benzyl alcohol paint stripping composition C, and three coupons 19–21 were treated with the same composition to which was added 5% by volume of 3-glycidoxypropyl trimethoxy silane (Z-6040).

| Composition C | |
|---|---|
| Ingredients | % by weight |
| Benzyl alcohol | 30–40 |
| Ethanolamine | 5–10 |
| 2-Ethylhexyl Mercopto Acetate | 1–5 |
| Petroleum hydrocarbon | 1–5 |
| Water | balance |

The treated coupons are then subjected to the embrittlement testing under the load of 7071 pounds for a plurality of hours, with the following results:

| Coupon | Test Duration | Results | Static Residual (lbs) | % original Notch Strength |
|---|---|---|---|---|
| 16 | 200 hrs | No failure | 7920 | 84 |
| 17 | 196.5 hrs | Failure | — | NA |
| 18 | 200 hrs | No failure | 7900 | 83.8 |
| 19 | 260.7 hrs | Failure | — | NA |
| 20 | 308.7 hrs | No failure | 8490 | 91.8 |
| 21 | 308.7 hrs | No failure | 8430 | 91.2 |

In subsequent testing three of the control coupons 22–24 were treated with the following commercially-available benzyl alcohol paint stripping composition D, and six coupons were treated with the same composition to which was added 5% by volume of 3-glycidoxypropyl trimethoxy silane (Z-6040) for coupons 25–27 and 5% by volume of siloxane silane (Rain-X®) for coupons 28–30.

| Composition D | |
|---|---|
| Ingredients | % by weight (approx.) |
| Benzyl alcohol | 30–40 |
| Ethanolamine | 5–10 |
| 2-Ethylhexyl hydrocarbon | 1–5 |

-continued

| Composition D | |
|---|---|
| Ingredients | % by weight (approx.) |
| Petroleum hydrocarbon | 1–5 |
| Ammonium hydroxide | 1–5 |
| Sodium nitrate | 1–3 |

The treated coupons are then subjected to the embrittlement testing under the load of 7071 pounds for a plurality of hours, with the following results:

| Coupon | Test Duration | Results | Static Residual (lbs) | % original Notch Strength |
|---|---|---|---|---|
| 22 | 181.7 hrs | Failure | — | NA |
| 23 | 181.7 hrs | Failure | — | NA |
| 24 | 181.7 hrs | Failure | — | NA |
| 25 | 307.2 hrs | No failure | 8700 | 94.1 |
| 26 | 307.2 hrs | No failure | 8700 | 93.4 |
| 27 | 307.2 hrs | No failure | 8700 | 90.8 |
| 28 | 406 hrs | No failure | 8570 | 92.7 |
| 29 | 406 hrs | No failure | 8590 | 92.9 |
| 30 | 406 hrs | No failure | 8600 | 93.0 |

In further testing, three of the control coupons 31–33 were treated with the following commercially-available benzyl alcohol paint stripping composition E, and three of the coupons 34–36 were treated with the same composition to which was added 5% by volume of 3-glycidoxypropyl trimethoxy silane (Z-6040).

| Composition E | |
|---|---|
| Ingredients | % by weight (approx.) |
| Benzyl alcohol | 30–60 |
| Ammonia | 1–10 |
| Linear Alkylated Aryl Hydrocarbon | 1–10 |
| Phenyl methyl ether (Anisole) | 5–20 |
| Water | 24–45 |

The treated coupons are then subjected to the embrittlement testing under the load of 7071 pounds for a plurality of hours, with the following results:

| Coupon | Test Duration | Results | Static Residual (lbs) | % original Notch Strength |
|---|---|---|---|---|
| 31 | 200 hrs | No failure | 8770 | 94.8 |
| 32 | 196.5 hrs | Failure | None | NA |
| 33 | 196.5 hrs | Failure | None | NA |
| 34 | 329 hrs | No failure | 8150 | 88.1 |
| 35 | 329 hrs | No failure | 8150 | 88.1 |
| 36 | 329 hrs | No failure | 8170 | 92.7 |

Many variations of the present invention will suggest themselves to those skilled in this art in light of the above, detailed description. All such obvious variations are within the full intended scope of the appended claims.

I claim:

1. Method for applying an aqueous benzyl alcohol paint stripping composition to a painted high strength steel substrate while protecting the steel substrate against the effects of hydrogen-induced embrittlement, hydrogen-induced cracking and corrosion normally caused by aqueous benzyl alcohol, which comprises applying a liquid silane to the painted steel substrate and subsequently applying thereover an aqueous benzyl alcohol paint stripping composition to form a protective silane barrier layer on the surface of the steel substrate during the paint stripping action.

2. Method according to claim 1 in which the aqueous benzyl alcohol paint stripping composition also contains from about 1% to about 10% by volume of a liquid silane.

3. Method according to claim 1 in which the liquid silane is applied as an ingredient of the aqueous benzyl alcohol paint stripping composition.

4. Method according to claim 3 in which the aqueous benzyl alcohol paint stripping composition contains from about 1% to about 10% by volume of the liquid silane.

5. Method according to claim 4 in which the liquid silane is selected from the group consisting of hydroxy-terminated silanes, lower alkoxy-terminated silanes and siloxanes.

6. An aqueous benzyl alcohol composition for stripping a paint composition from a high strength steel substrate while protecting the steel substrate against the effects of hydrogen-induced embrittlement, hydrogen-induced cracking and corrosion normally caused by aqueous benzyl alcohol, consisting essentially of between about 35% to about 50% by volume of benzyl alcohol, between about 5% to about 10% by volume of liquid silane compound which forms a protective barrier layer on the substrate, 1% to 10% by volume of an alkali, and 3% to 15% by volume of a wetting agent having an affinity for both water and for benzyl alcohol, to produce a miscible mixture thereof, and the balance water.

7. A composition according to claim 6 in which the liquid silane compound is a hydrophilic compound selected from the group consisting of hydroxy-terminated silanes, lower alkoxy-terminated silanes and siloxanes.

8. A composition according to claim 6 further containing from about 1% to 10% by weight of an alkali.

9. A composition according to claim 8 in which the alkali is selected from the group consisting of alkali metal hydroxides, alkaline earth metal hydroxides and ammonium hydroxide.

10. A composition according to claim 8 further containing from about 3% to 15% by weight of a wetting agent having an affinity for both water and for benzyl alcohol to produce miscible mixtures thereof.

11. A composition according to claim 10 in which said wetting agent is selected from the group consisting of boric acid-diethanolamine reaction products and long chain alkyl-substituted aryl compounds.

* * * * *